US009315326B2

(12) United States Patent
Magni et al.

(10) Patent No.: US 9,315,326 B2
(45) Date of Patent: Apr. 19, 2016

(54) ACCUMULATION PALLET CONVEYOR

(71) Applicant: Comau S.p.A., Grugliasco (Turin) (IT)

(72) Inventors: Gianni Magni, Turin (IT); Gianpiero Gromme, Turin (IT)

(73) Assignee: Comau, S.p.A., Grugliasco (Torino) (IT)

( * ) Notice: Subject to any disclaimer, the term of this patent is extended or adjusted under 35 U.S.C. 154(b) by 0 days.

(21) Appl. No.: 14/440,121

(22) PCT Filed: Nov. 12, 2013

(86) PCT No.: PCT/IB2013/060082
§ 371 (c)(1),
(2) Date: May 1, 2015

(87) PCT Pub. No.: WO2014/080315
PCT Pub. Date: May 30, 2014

(65) Prior Publication Data
US 2015/0284186 A1   Oct. 8, 2015

(30) Foreign Application Priority Data

Nov. 20, 2012  (EP) .................................... 12193357

(51) Int. Cl.
*B65G 37/00* (2006.01)
*B65G 17/00* (2006.01)
*B65G 35/06* (2006.01)

(52) U.S. Cl.
CPC .............. *B65G 17/005* (2013.01); *B65G 35/06* (2013.01)

(58) Field of Classification Search
CPC ...... B65G 35/06; B65G 35/08; B65G 17/002; B65G 17/005; B65G 17/06; B65G 17/12
USPC .......... 198/795, 465.1, 343.1, 343.2
See application file for complete search history.

(56) References Cited

U.S. PATENT DOCUMENTS 3,949,859 A * 4/1976 Nussbaumer ........ B65G 17/002
                                                                198/345.3
4,088,220 A * 5/1978 Jacksch ................ B23Q 7/1452
                                                                198/343.2

(Continued)

FOREIGN PATENT DOCUMENTS

DE        195 28 922 A1    4/1996
FR           2311734 A1    12/1976

(Continued)

OTHER PUBLICATIONS
European Search Report dated Apr. 8, 2013.

(Continued)

*Primary Examiner* — James R Bidwell
(74) *Attorney, Agent, or Firm* — Young Basile Hanlon & MacFarlane P.C.

(57) ABSTRACT

In an accumulation pallet conveyor (1) with an upper horizontal conveying run (1A) and a lower horizontal return run (1B) the pallets are carried by respective pallet-carrying members (P1) drawn by an endless chain (2). Each pallet-carrying member (P1) has at least one sprocket wheel (3) that engages without turning the chain (2) along the horizontal runs of the conveyor for drawing the respective pallet-carrying member (P1) together with the chain. In the case where a pallet-carrying member is stopped in position along a horizontal run of the conveyor (1) the aforesaid sprocket wheel carried by the pallet-carrying member (P1) starts to turn, enabling movement of the chain with respect to the pallet-carrying member (P1). In the curved stretches of the chain, at each end of the conveyor, the movement of the pallet-carrying member (P1) is caused by an engagement finger (F) that engages the chain and couples therewith only in said curved stretches of the chain. The engagement finger (F) is biassed against the chain by spring means (7) in such a way that in the case where the pallet-carrying member (P1) is stopped in position along the curved stretch of the chain, the chain can continue to move, causing a movement with multiple consecutive jumps of the engagement finger (F).

4 Claims, 9 Drawing Sheets

(56) References Cited

U.S. PATENT DOCUMENTS

| | | | |
|---|---|---|---|
| 4,431,102 A | | 2/1984 | Bittner |
| 4,776,453 A | * | 10/1988 | Miller .................. B65G 17/24 198/465.3 |
| 4,934,515 A | * | 6/1990 | Linden ................. B65G 17/002 198/465.3 |
| 5,735,384 A | * | 4/1998 | Lingo .................. B65G 17/002 198/343.1 |
| 5,873,453 A | * | 2/1999 | Vetter .................. B65B 19/223 198/468.01 |
| 5,964,562 A | | 10/1999 | Bernard, II et al. |
| 6,019,214 A | | 2/2000 | Herronen et al. |
| 6,070,534 A | | 6/2000 | Lehrieder |
| 6,568,525 B2 | | 5/2003 | Stone et al. |
| 6,591,488 B1 | | 7/2003 | Tachibana |
| 7,258,223 B2 | | 8/2007 | Strange |
| 8,820,518 B2 | * | 9/2014 | Pac Gracia ........... B65G 17/002 198/795 |
| 2005/0247546 A1 | | 11/2005 | Strange |
| 2010/0300841 A1 | | 12/2010 | O'Brien |
| 2011/0314665 A1 | | 12/2011 | Kilibarda |
| 2014/0138213 A1 | | 5/2014 | Magni et al. |

FOREIGN PATENT DOCUMENTS

| | | |
|---|---|---|
| JP | 59073246 | 4/1984 |
| JP | 05278854 | 10/1993 |
| JP | 2007216340 | 8/2007 |

OTHER PUBLICATIONS

Notification of Transmittal of the International Search Report and the Written Opinion of the International Searching Authority, or Declaration dated Feb. 6, 2014.

* cited by examiner

ACCUMULATION PALLET CONVEYOR

FIELD OF THE INVENTION

The present invention relates to accumulation pallet conveyors.

BACKGROUND

A conveyor of the type referred to below first in the Summary of the Invention is, for example, described in the document DE 195 28 922 C2. In this known solution, the engagement finger provided on each pallet-carrying member is rigidly connected to the structure of said member. From U.S. Pat. No. 6,070,534 a pallet conveyor is known where the pallets are not recirculated and in which the pallets are forced to follow the conveyor chain along the conveyor upper run by one or two elastically biased fingers carried by each pallet supporting member.

OBJECT OF THE INVENTION

The object of the present invention is to provide a conveyor of the type specified above that will be more efficient and safer in operation and that at the same time will present a simple, reliable, and low-cost structure. In particular, the object of the invention is to render the conveyor more safe both for the operator (with particular reference to situations where the operator may involuntarily interfere with the pallets on the conveyor) and for the conveyor itself (in the sense that there is no risk of damage to the conveyor in the case of involuntary interference of the pallets with the operator or with robots or other foreign bodies during operation).

SUMMARY OF THE INVENTION

The present invention relates to accumulation pallet conveyors, with an upper conveying run and a lower return run. In particular, the subject of the invention is a conveyor for recirculating a plurality of pallets along an endless path, comprising two horizontal runs parallel to, and superimposed upon each other and connected to each other by two curved portions at the opposite ends of the conveyor. Further in particular, the subject of the invention is a conveyor of the type referred to above, comprising:

a supporting structure;

an endless chain engaged on sprocket wheels rotatably mounted at the two opposite ends of the supporting structure of the conveyor about two mutually parallel horizontal axes;

motor means for controlling movement of said endless chain;

a plurality of pallet-carrying members guided on said supporting structure along said endless path; and a plurality of pallets, each carried by a respective pallet-carrying member and prearranged for conveying one or more components along the upper horizontal run of the conveyor, wherein each pallet-carrying member comprises at least one sprocket wheel rotatably mounted on the pallet-carrying member with interposition of a friction coupling in such a way that said sprocket wheel is designed to engage without turning on said chain along the horizontal runs of the conveyor so as to force the pallet-carrying member to follow the movement of the chain, whilst said sprocket wheel is designed to turn about its axis to enable the chain to continue to move with respect to the pallet-carrying member when the pallet-carrying member is stopped along the path, and wherein the ascent and descent of each pallet-carrying member at the ends of the conveyor are caused by engagement on the chain of an engagement finger projecting from the body of the pallet-carrying member, said finger being adapted to engage the chain and to get coupled therewith in the curved portions at the two ends of the conveyor.

With a view to achieving this object, the subject of the invention is a conveyor having all the characteristics referred to at the start of the Summary of Invention description and moreover characterized in that the aforesaid engagement finger of each pallet-carrying member is slidably mounted along its axis with respect to the structure of the respective pallet-carrying member and is biased against the chain by spring means set between the engagement finger and the structure of the pallet-carrying member in such a way that if a pallet-carrying member is blocked in position in the curved portion of the chain at one of the ends of the conveyor due to an involuntary interference with an operator or any other foregoing bodies, the chain can continue to move freely with respect to said pallet-carrying member, causing a movement with multiple consecutive jumps of the engagement finger on the chain.

Thanks to the aforesaid characteristics, there is obtained with simple and low-cost means the possibility of guaranteeing safe operation of the conveyor even in the case where, for any reason, the movement of a pallet-carrying member at one of the ends of the conveyor may jam, when the pallet-carrying member is ascending from the lower run to the upper run or is descending from the upper run to the lower run.

BRIEF DESCRIPTION OF THE DRAWINGS

Further characteristics and advantages of the invention will emerge from the ensuing description, with reference to the annexed drawings, which are provided purely by way of non-limiting example and in which.

DETAILED DESCRIPTION OF A PREFERRED EMBODIMENT

Figure 1:
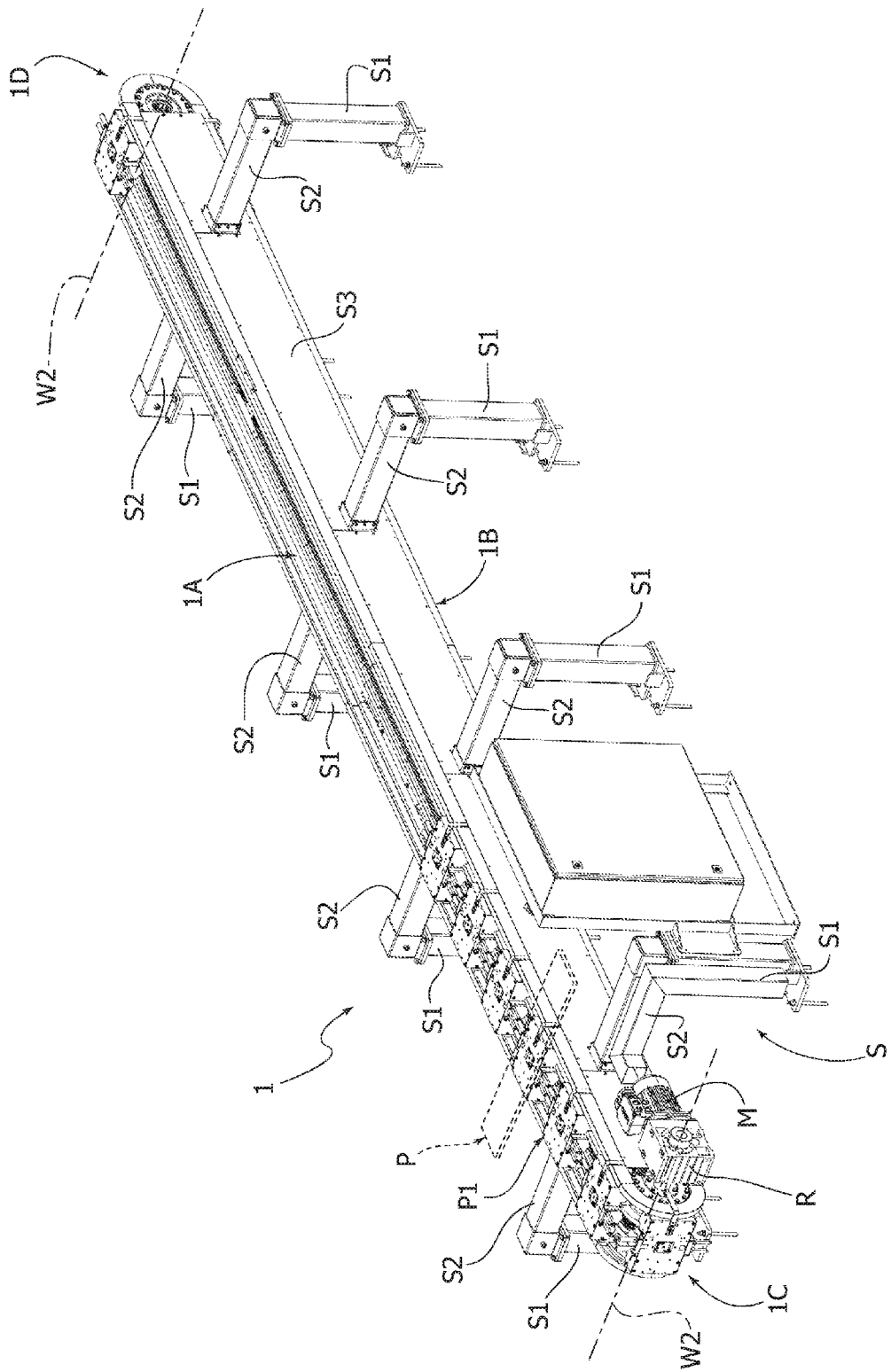
FIG. 1 is a perspective view of a preferred embodiment of the conveyor according to the invention.

With reference to FIG. 1, number 1 designates as a whole an accumulation pallet conveyor for recirculating a plurality of pallets along an endless path, comprising an upper horizontal run 1A, for conveying components carried by the pallets, a lower run 1B for return of the pallets, an end 1C at which the pallets that have reached the end of the horizontal conveying run descend towards the lower return run, and an opposite end 1D, where the pallets that reach the end of the lower return run 1B ascend towards the upper run, where they are loaded with one or more components to be conveyed to the opposite end of the conveyor.

Conveyors of the type specified above are normally used in industrial plants, for example for carrying components from a workstation where the components are loaded on the conveyor to a workstation where the components are unloaded from the conveyor. The operations of loading and unloading can be carried out manually by operators, or else automatically by industrial robots.

Only FIG. 1 of the annexed drawings shows by way of example a pallet P mounted on a respective pallet-carrying member P1. The other pallets P have been removed for greater clarity of illustration in order to show the pallet-carrying members P1 and the way in which they are guided along the conveyor 1.

The conveyor 1 comprises a fixed supporting structure S, including a plurality of columns SI and cross members S2, which in turn support the fixed structure S3 of the conveyor.

The structure S3 defines first and second guide tracks C1, C2 (FIG. 3) for a plurality of pallet-carrying members P1 in the form of carriages, which in what follows are thus referred to as "pallet-carrying carriages".

Figure 2:
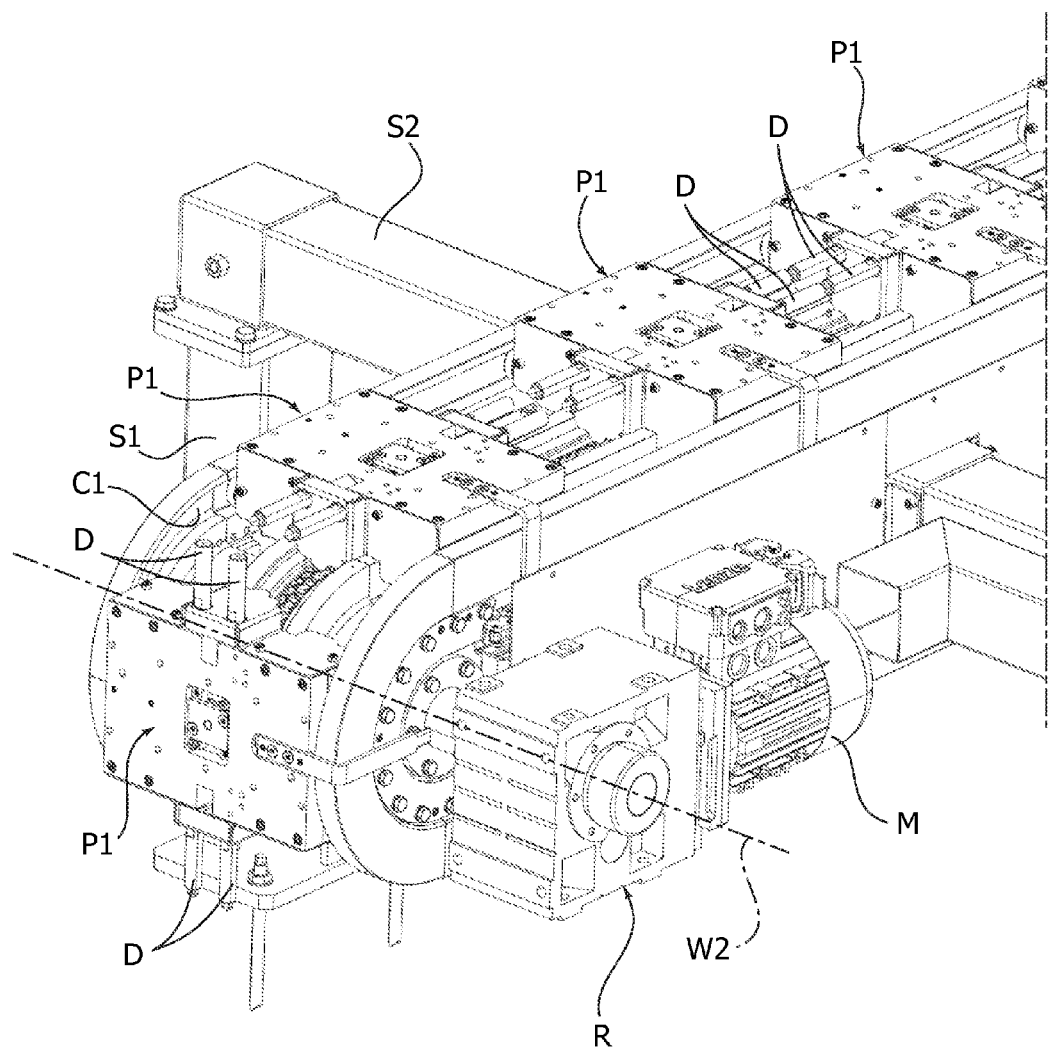
FIG. 2 is a perspective view at an enlarged scale of a detail of FIG. 1.
Figure 3:
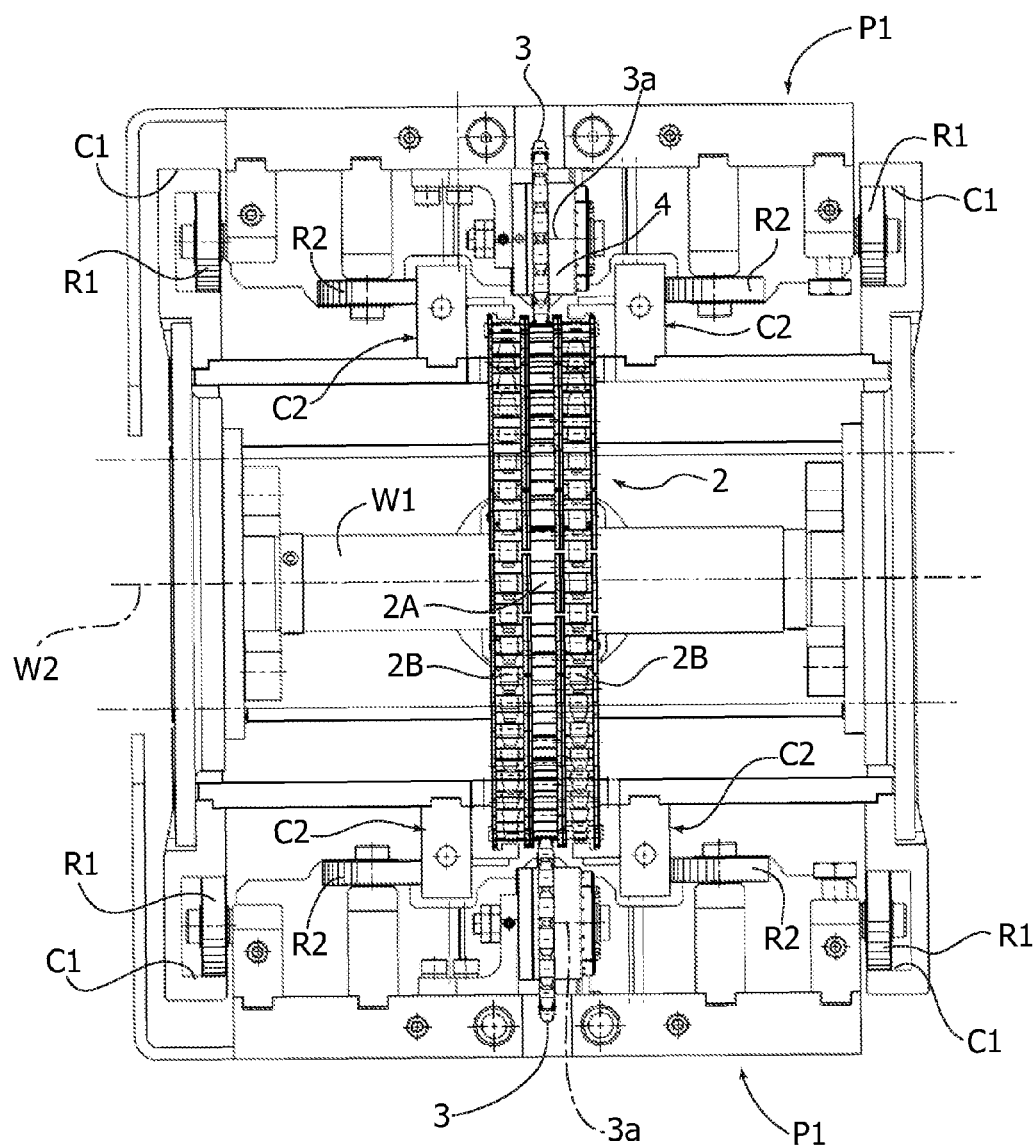
FIG. 3 is a partial end view of the conveyor shown in FIG. 1, with some parts removed for clarity.
Figure 4:
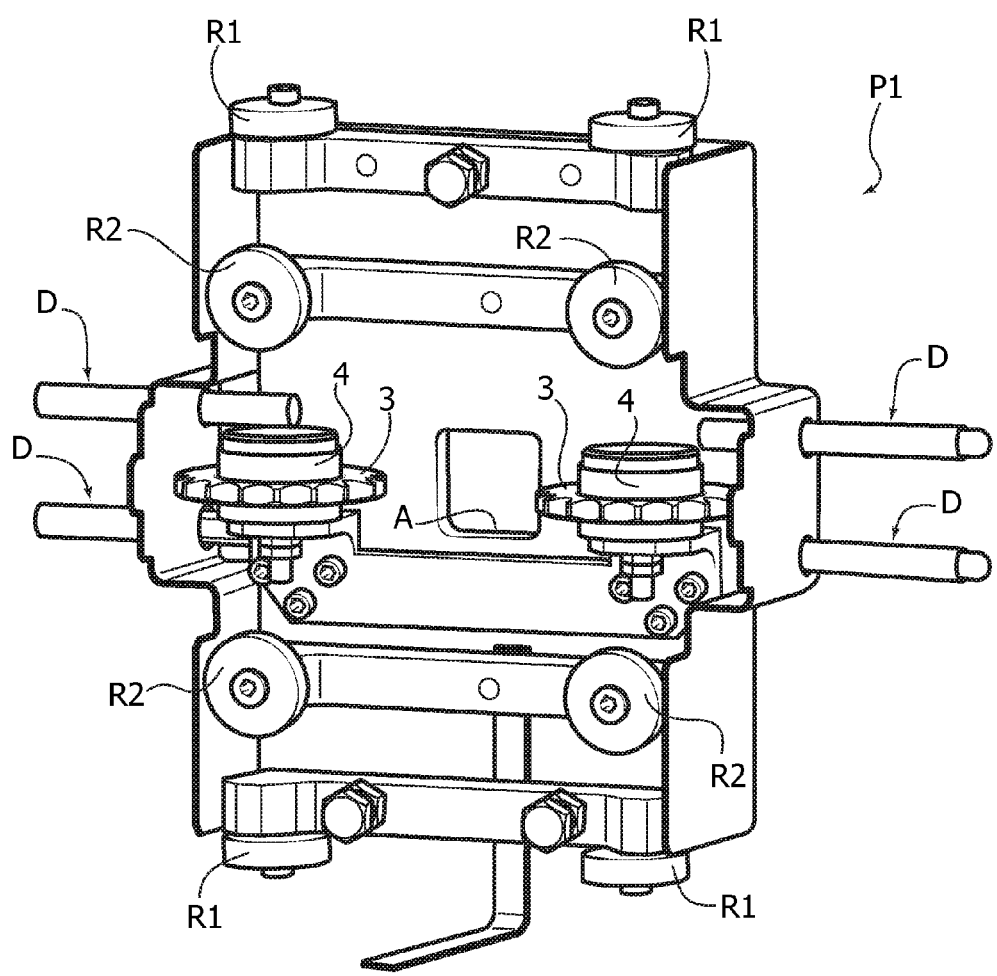
FIG. 4 is a perspective view of a pallet-carrying member of the conveyor.

The pallet-carrying carriages are guided along an endless path, including the two horizontal runs 1A, 1B superimposed upon each other and the two curved portions 1C, 1D at the ends of the conveyor. With reference to FIG. 3, each pallet-carrying carriage P1 is provided with wheels R1, R2 for engagement, respectively, of the aforesaid tracks C1, C2. With reference also to FIG. 4, each pallet-carrying carriage P1 is provided with two pairs of wheels R1 and two pairs of wheels R2. The opposite ends of the structure of the carriage also carry two pairs of spacer pins D designed to keep the pallet-carrying carriages P1 at a distance from one another when they accumulate behind a carriage that is blocked along the path of the conveyor, according to what will be illustrated in what follows (see also FIG. 2).

Movement of the pallet-carrying members P1 along the conveyor is governed by a chain 2 (FIG. 3), which in the case of the example illustrated is a chain constituted by three parallel links, which include a central link 2A and side links 2B. The chain 2 engages on sprocket wheels W (see FIG. 5), the shafts W1 of which are rotatatbly mounted about two horizontal axes W2 at the ends of the conveyor (FIGS. 1 and 3). The sprocket wheels provided at one end of the conveyor are driving sprocket wheels, driven in rotation by an electric motor M via a reducer assembly R (FIGS. 1 and 2). FIG. 3 shows the shaft W1 by means of which the sprocket wheels for engagement of the chain 2 are rotatably mounted at one end of the conveyor.

With reference once again to FIGS. 3 and 4, rotatably mounted on the structure of the pallet-carrying member P1 are two sprocket wheels 3. Each sprocket wheel 3 is rotatably mounted on its axis 3a with the interposition of a friction coupling 4 that enables free rotation of the respective sprocket wheel 3 only above a given rotational torque. Thanks to said arrangement, each sprocket wheel 3 engages without turning the chain 2 in the horizontal stretches 1A, 1B of the conveyor, functioning as simple engagement member that forces the respective pallet-carrying carriage P1 to follow the movement of the chain. In the case where a pallet-carrying carriage P1 is stopped in a position along a horizontal stretch 1A or 1B, the chain 2 can continue to move with respect to the pallet-carrying member P1 in so far as it simply causes rotation of the sprocket wheels 3, without managing to draw along the pallet-carrying carriage P1.

Provided at the ends of the conveyor, where each carriage P1 is to be withheld in the movement of ascent or descent, is a second engagement member fixed within an opening of the plate constituting the main structure of each pallet-carrying carriage P1 (FIG. 4).

Figure 8:
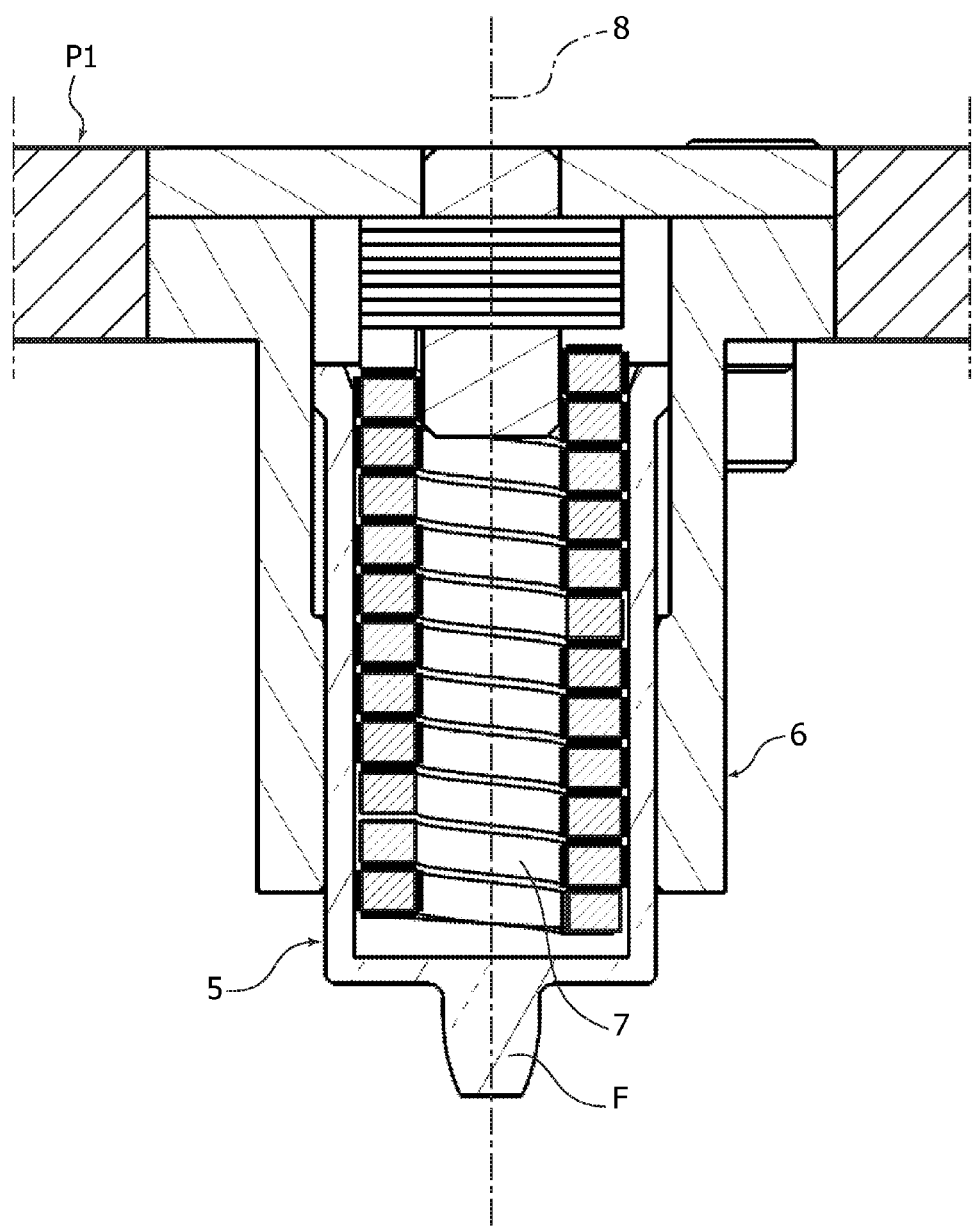
FIGS. 8 and 9 are a cross-sectional view and a schematic, partially cut-away perspective view of an engagement finger prearranged on board a pallet-carrying member of the conveyor according to the invention.
Figure 9:
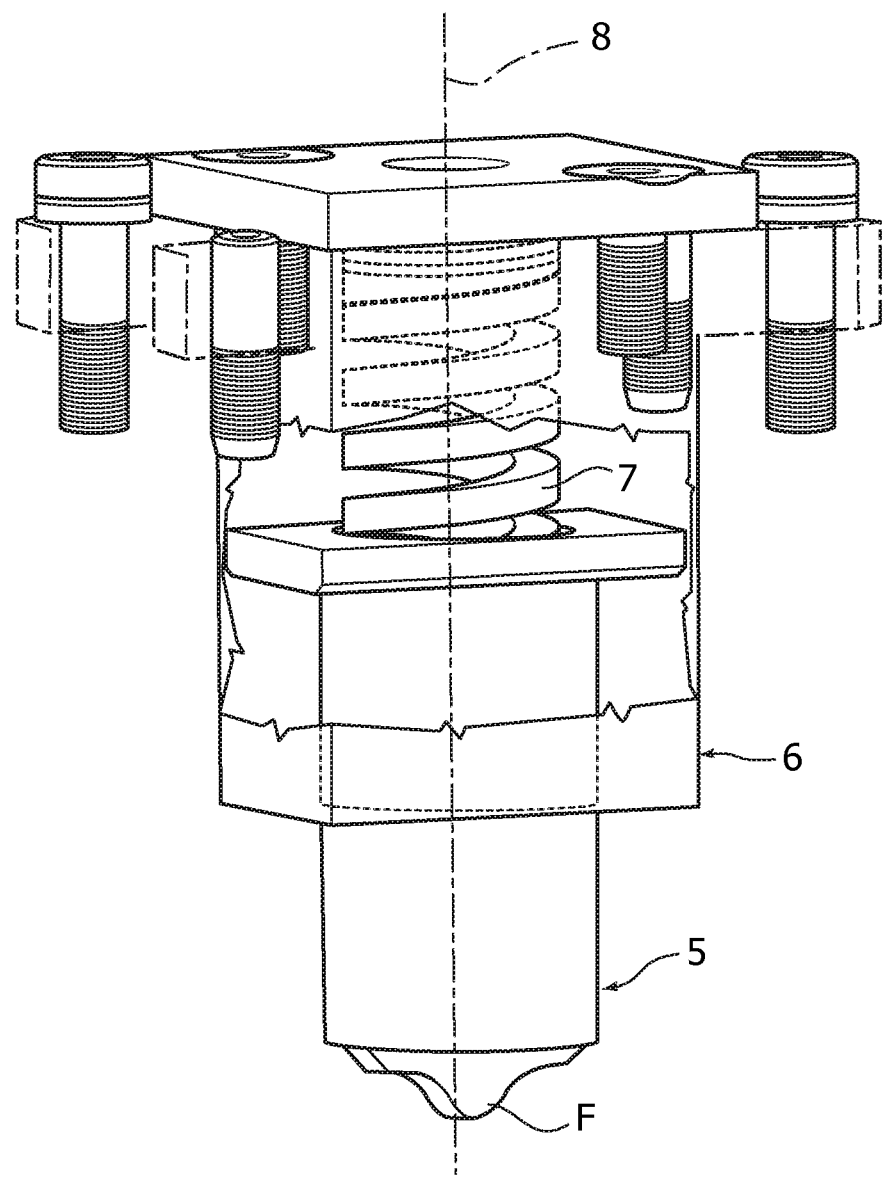

With reference to FIGS. 8 and 9, the aforesaid engagement finger with which each pallet-carrying carriage P1 is provided is constituted by a front end F of a cylindrical body 5 slidably mounted along its axis 8 within a guide body 6 that is screwed to the wall of the pallet-carrying carriage P1, within the opening A. The cylindrical body 5 is hollow and is provided inside with a helical spring 7 that is set between the body 5 of the engagement finger F and the structure rigidly connected to the pallet-carrying carriage P1 so as to tend to push the engagement finger F to engage with the chain 2.

Figure 5:
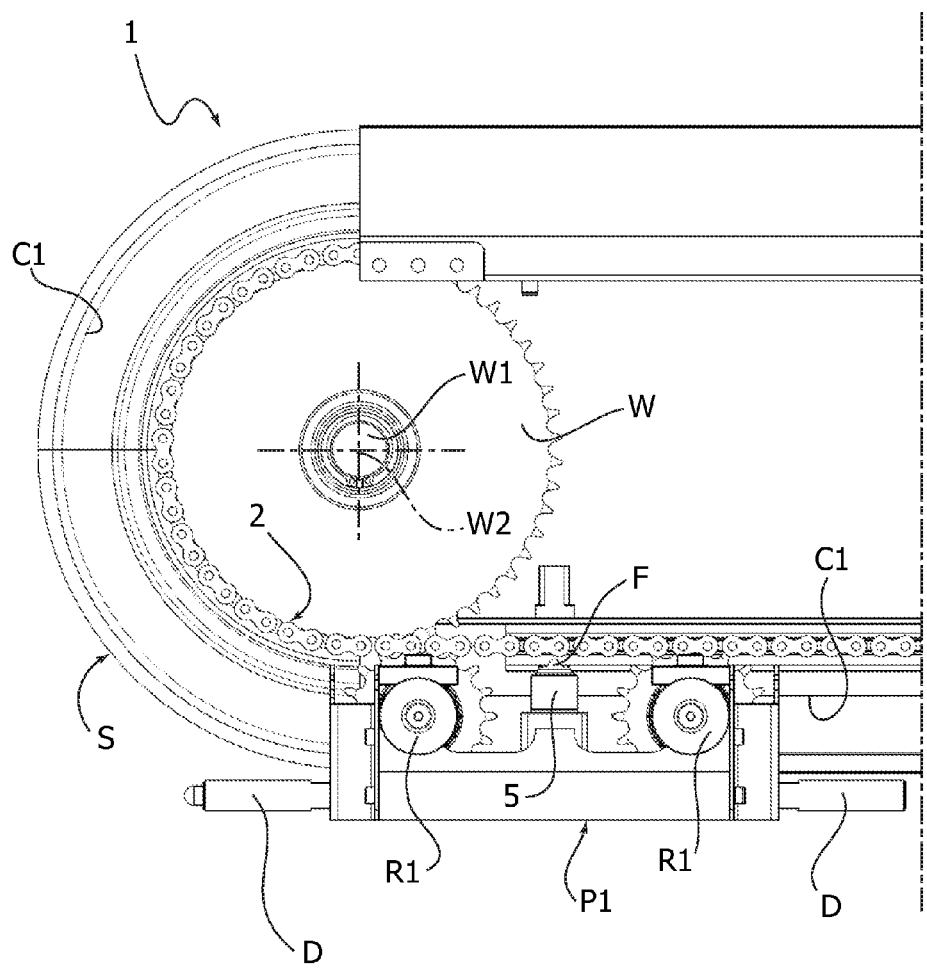
FIGS. 5 and 6 are side views that show two steps of the movement of ascent of a pallet-carrying carriage at one end of the conveyor.
Figure 6:
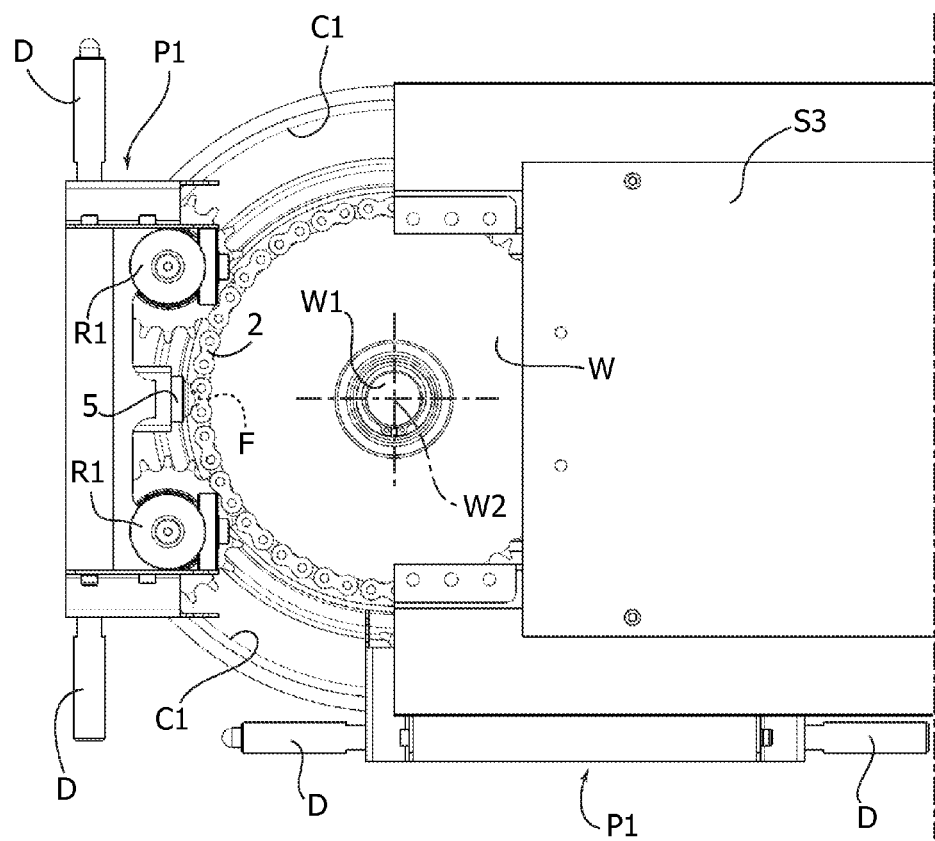
Figure 7:
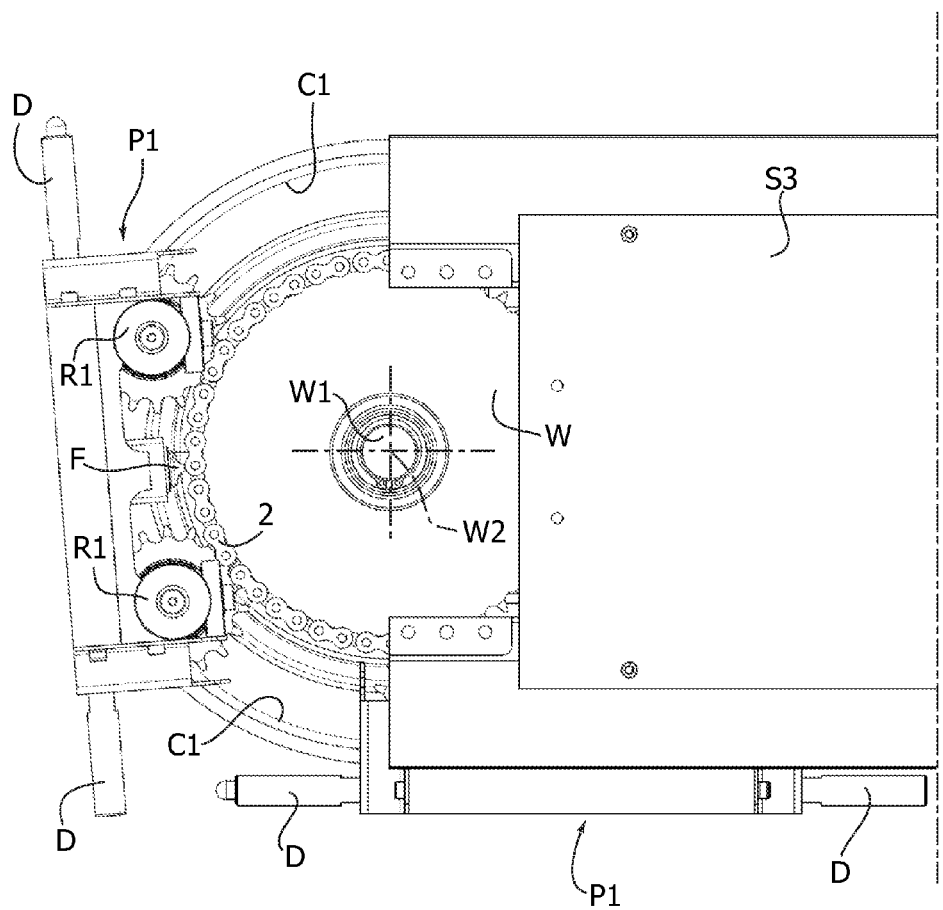
FIG. 7 is a side view similar to those of FIGS. 5 and 6 that shows the condition where a pallet-carrying carriage is blocked in position at one end of the conveyor.

The guides C1, C2 provided on the fixed structure of the conveyor for guiding the wheels R1, R2 of the pallet-carrying carriages P1 are configured in such a way that in the horizontal runs 1A, 1B of the conveyor the engagement finger F of each pallet-carrying carriage P1 remains at a distance from the link of the chain 2 facing it. However, said configuration of the guides is provided in such a way that, instead, in the curved portions of the chain at the two ends of the conveyor, the engagement finger F provided on each pallet-carrying carriage P1 progressively engages within the link of the chain facing it, until it rigidly couples therewith at the start of the curved stretch of the chain. Said mode of operation is visible in FIGS. 5 and 6, which show the ascent of a pallet-carrying carriage P1 from the final end of the lower run of the conveyor towards the initial end of the upper run. FIG. 5 shows the carriage immediately prior to start of the movement of ascent, whereas FIG. 6 shows the carriage in the intermediate step of the movement of ascent. In the condition visible in FIG. 5, the finger F is set at a distance from the link of the chain 2 facing it, whilst in the step of ascent illustrated in FIG. 6, the finger F has penetrated into the link of the chain so as to couple the pallet-carrying carriage P1 with the chain and draw it upwards towards the upper run of the chain. Thanks to the structure and arrangement illustrated in FIGS. 8 and 9, the conveyor continues to function properly, even in the case where, for any reason, a pallet-carrying carriage remains blocked in position during ascent or descent to one end of the conveyor. FIG. 7 illustrates said situation with reference to the case already described above of a pallet-carrying carriage P1 that is ascending from the lower run to the upper run at one end of the conveyor. In the condition illustrated, it is assumed that the carriage has got trapped in a position fixed with respect to the supporting structure of the conveyor (for example, on account of an involuntary interference with an operator or with a robot or other foreign body). In said step, the movement of the chain can continue normally, determining at the same time a movement with multiple consecutive jumps of the engagement finger F, which is allowed by the spring 7 associated thereto.

As may be seen, the conveyor according to the invention is hence safe both for the operator (with reference to situations where the operator may involuntarily interfere with the pallets on the conveyor) and for the conveyor itself (in the sense that there is no risk of damage to the conveyor in the case of involuntary interference of the pallets of the conveyor with the operator or with robots or other foreign bodies during operation). This result is on the other hand obtained with a particularly simple and low-cost structure.

Of course, without prejudice to the principle of the invention, the details of construction and the embodiments may vary widely with respect to what has been described and illustrated herein purely by way of example, without thereby departing from the scope of the present invention.

The invention claimed is:

1. An accumulation pallet conveyor, for recirculating a plurality of pallets along an endless path, comprising an upper and lower horizontal run arranged parallel to, and superimposed upon each other, said runs being connected to each other by two curved opposite end portions situated at opposite ends of the conveyor, said conveyor comprising:
   a supporting structure defining an endless path having an upper horizontal run and a lower horizontal run;
   an endless chain engaged on respective sprocket wheels which are rotatably mounted at two opposite ends of said supporting structure about two mutually parallel horizontal axes;
   motor means for controlling the movement of said endless chain;
   a plurality of pallet-carrying members guided on said supporting structure along said endless path each having a body; and
   a plurality of pallets, each carried by a respective pallet-carrying member and adapted for conveying one or more components along the upper horizontal run of the conveyor,
   wherein each pallet-carrying member comprises at least one sprocket wheel rotatably mounted about an axis on the pallet-carrying member with the interposition of a friction coupling, so that said sprocket wheel is adapted to engage without turning on said chain along the upper and the lower horizontal runs of the conveyor so as to force the pallet-carrying member to follow the movement of the chain, said sprocket wheel is adapted to turn about the sprocket wheel axis to enable the chain to continue to move with respect to the pallet-carrying member when the pallet-carrying member is stopped along the endless path, and
   wherein the ascent and descent of each pallet-carrying member at the opposite ends of the conveyor are caused by engagement on the chain of an engagement finger projecting from the body of the pallet-carrying member, said finger being adapted to engage the chain and to get coupled therewith in the curved opposite end portions at the two ends of the conveyor,
   said conveyor being characterized in that said engagement finger of each pallet-carrying member having an axis, the engagement finger is slidably mounted along the axis with respect to the body of the respective pallet-carrying member and is biassed against the chain by spring means positioned between the engagement finger and the body of the pallet-carrying member in such a way that if a pallet-carrying member is blocked in position in the curved opposite end portions of the conveyor due to an involuntary interference with an operator or any other foreign bodies, the chain can continue to move freely with respect to said pallet-carrying member, causing a movement with multiple consecutive jumps of the engagement finger on the chain.

2. The conveyor according to claim 1, characterized in that the supporting structure of the conveyor has first and second guide tracks for rolling engagement of first and second wheels which are freely rotatably mounted on the body of each pallet-carrying member, said first and second guide tracks being configured in such a way that the engagement finger of each pallet-carrying member remains at a distance from a respective link of the chain facing it during the movement of the pallet-carrying member along the upper and lower horizontal runs of the conveyor, and wherein the engagement finger penetrates progressively into the chain link facing it until it couples with the engaged chain link at the start of the movement of the pallet-carrying member along a curved end portion of the conveyor at each end of the conveyor (1).

3. The conveyor according to claim 2 in that said engagement finger is positioned at a front end of a cylindrical body slidably mounted within a guide body fixed to the body of the pallet-carrying member.

4. The conveyor according to claim 2, characterized in that said cylindrical body is hollow and contains inside it a helical spring axially positioned between said cylindrical body and the body of the pallet-carrying member.

* * * * *